April 29, 1924.
L. I. HEINTZ
KNOCKDOWN TOP FOR VEHICLES
Filed Nov. 7, 1921     4 Sheets-Sheet 4
1,491,857
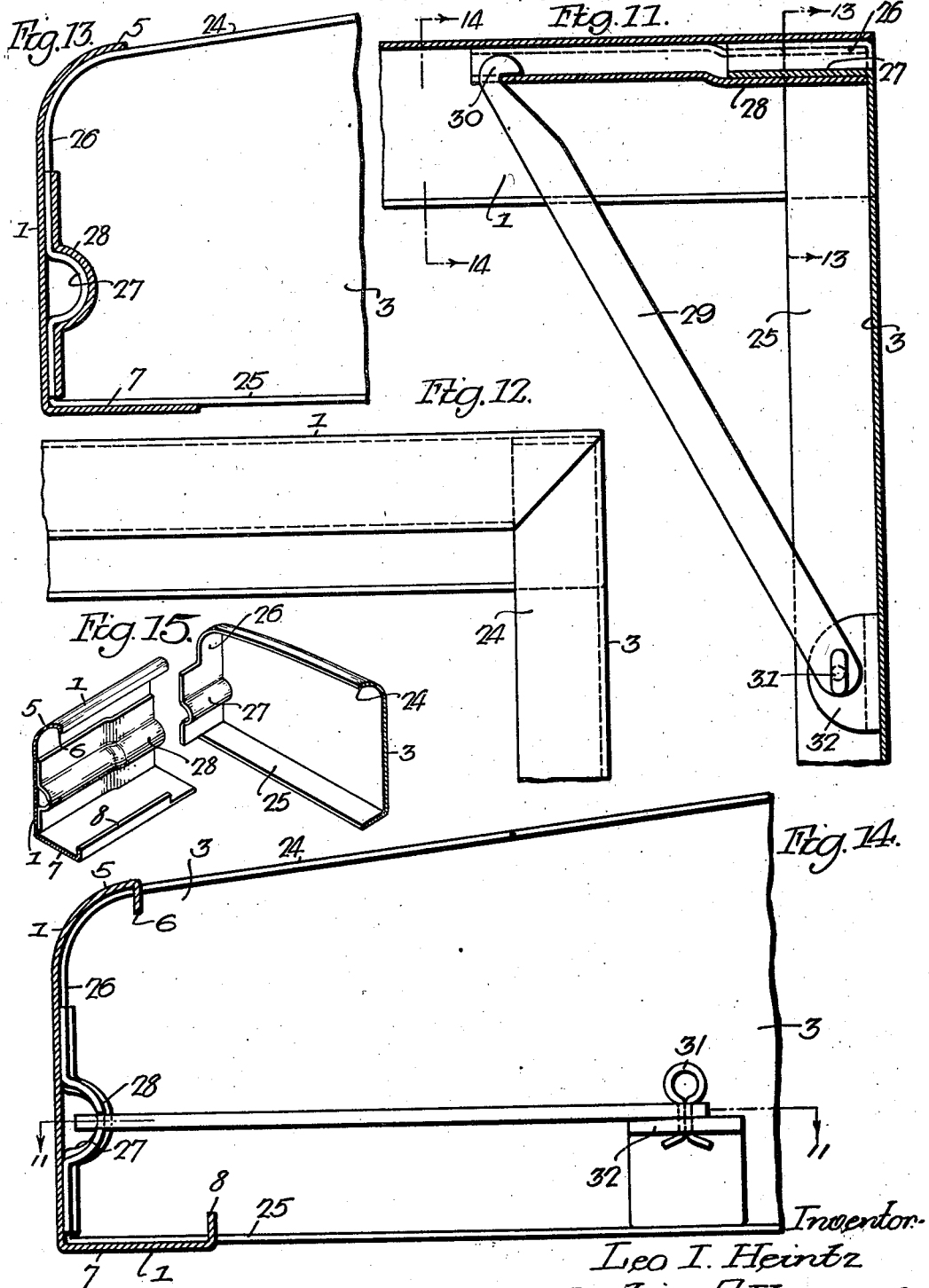
Inventor-
Leo I. Heintz
by his Attorneys- Patented Apr. 29, 1924.

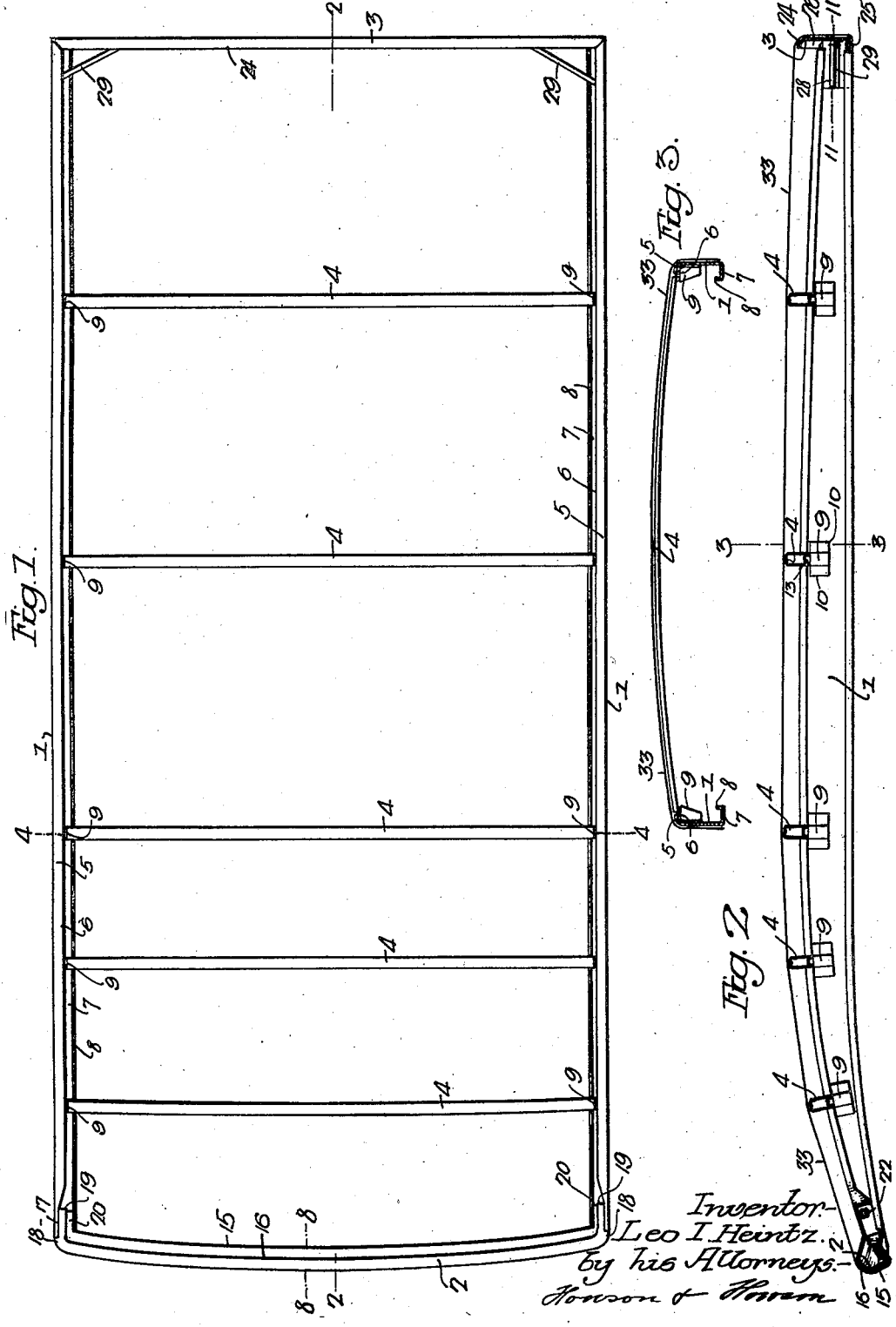

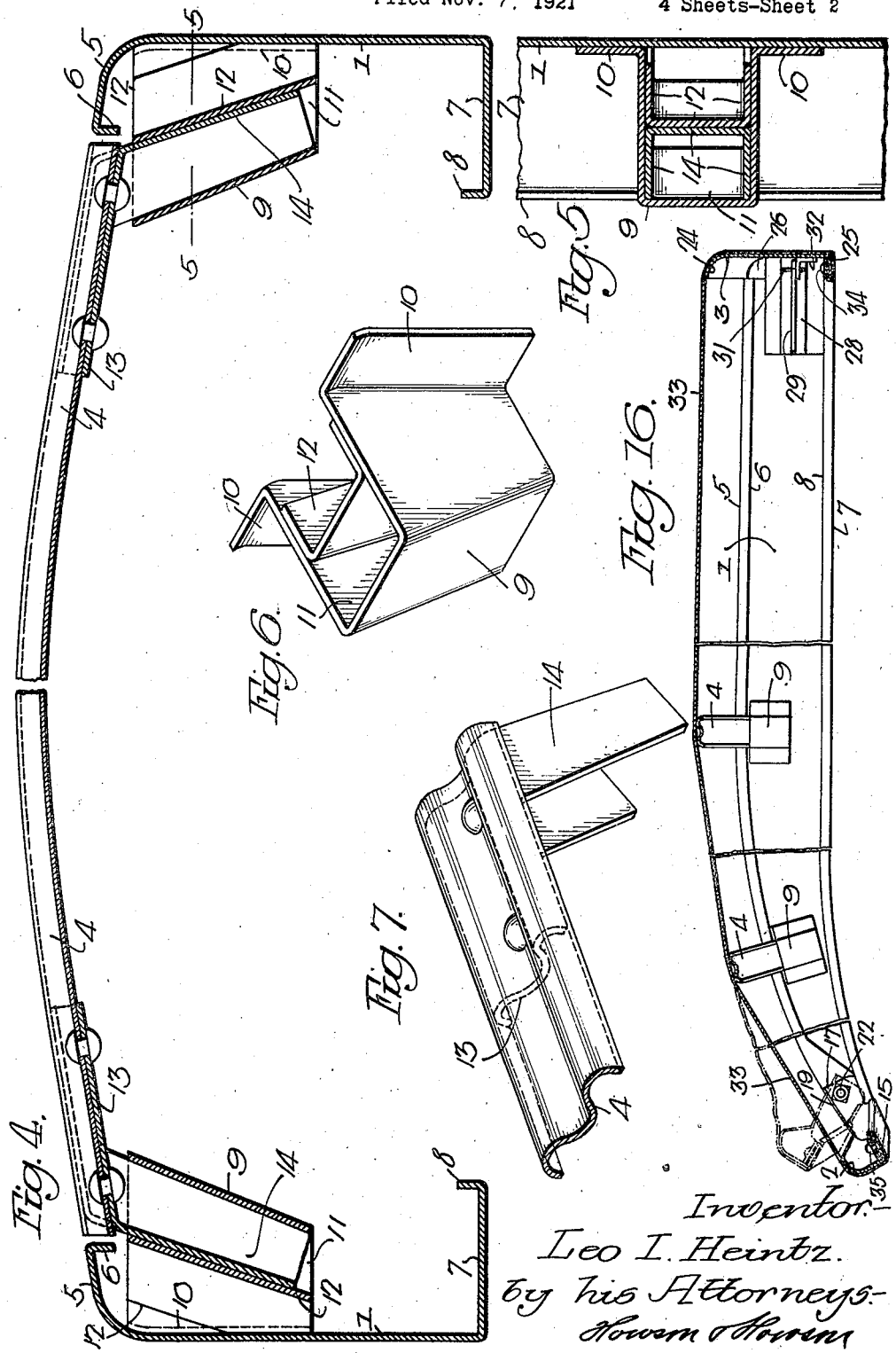

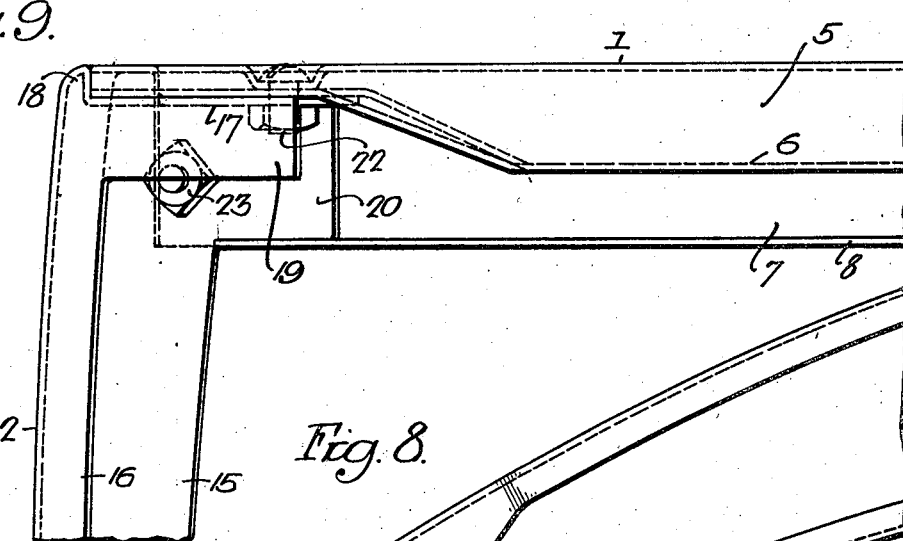
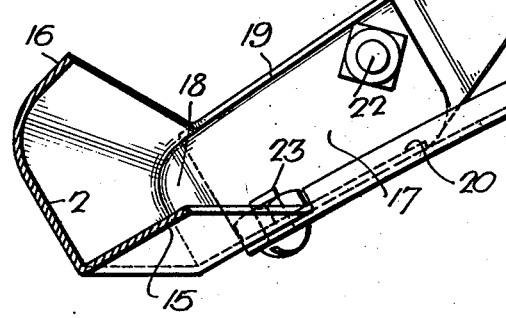
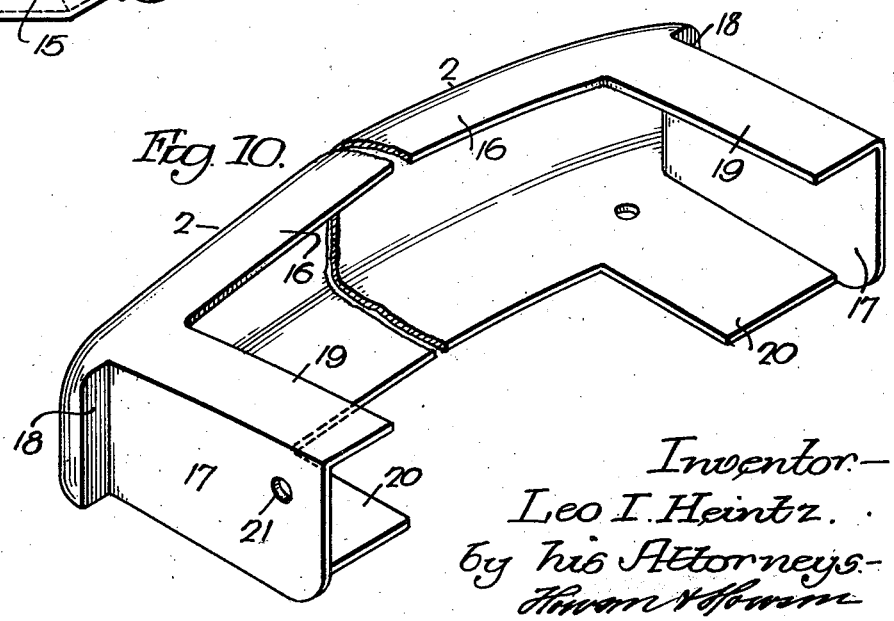

1,491,857

UNITED STATES PATENT OFFICE.

LEO I. HEINTZ, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

KNOCKDOWN TOP FOR VEHICLES.

Application filed November 7, 1921. Serial No. 513,415.

*To all whom it may concern:*

Be it known that I, LEO I. HEINTZ, a citizen of the United States, residing in Philadelphia, Pennsylvania, have invented certain Improvements in Knockdown Tops for Vehicles, of which the following is a specification.

The object of my invention is to construct a knock down roof for vehicle bodies and particularly the roofs of automobile trucks or delivery wagons.

A further object of the invention is to provide means for stretching the cover onto the frame after the parts of the frame are assembled.

A still further object is to dispense with the use of bolts or rivets in securing the bows to the side frames.

In the accompanying drawings:

Fig. 1 is a plan view of the frame of the top of an automobile truck or delivery wagon with the cover removed;

Fig. 2 is a longitudinal section view on the line 2—2 Fig. 1;

Fig. 3 is a transverse sectional view on the line 3—3, Fig. 2;

Fig. 4 is an enlarged transverse sectional view on the line 4—4, Fig. 1, showing the method of attaching the bows to the side frames;

Fig. 5 is a sectional view on the line 5—5, Fig. 4;

Fig. 6 is a detached perspective view of one of the sockets;

Fig. 7 is a detached perspective view of a portion of one of the bows showing the part that fits the socket;

Fig. 8 is an enlarged transverse sectional view on the line 8—8, Fig. 1;

Fig. 9 is a plan view illustrating one of the front corners of the top shown in Fig. 8;

Fig. 10 is a detached perspective view of a portion of a front frame;

Fig. 11 is a sectional plan view on the line 11—11, Figs. 2 and 14, illustrating one of the rear corners of the top;

Fig. 12 is a plan view of the corner illustrated in Fig. 11;

Fig. 13 is a sectional view on the line 13—13; Fig. 11;

Fig. 14 is a sectional view on the line 14—14; Fig. 11;

Fig. 15 is a detached perspective view showing the joint between the rear end frame and side frames; and Fig. 16 is a longitudinal sectional view showing the method of securing the cover to the front and rear end frames and method of stretching the cover on the top.

1—1 are the two side frames of an automobile truck top; 2 is the front end frame and 3 is the rear end frame. These end frames are secured to the side frames. Bows 4 are transversely arranged and extend from one side frame to the other and are spaced apart as desired. The side frames are made channel-shaped in cross section as clearly shown in Fig. 4 having a rounded upper flange 5 inturned at 6 to form a smooth edge and to strengthen the side frame. 7 is a lower flange upturned at 8. This construction makes a very substantial side frame which will not sag under ordinary conditions. Secured to the inner surface of each side frame is a series of sockets 9 made as shown in Fig. 6, having flanges 10 which are secured to the side frames 1 by electric welding or by rivets, if desired. The recess portion 11 of the socket is tapered as shown and is formed by the metal of the socket and a flanged filling piece 12 which is welded to the sides of the socket member as clearly shown in Fig. 6. Each bow 4 is corrugated in cross section as shown in Fig. 7 to add to its strength and a plate 13 is secured to each end of each bow by rivets or other suitable fastening means and each plate has a flanged extension 14 which is tapered to fit the opening 11 in the socket 9, as clearly shown in Fig. 4.

Each socket member is arranged on a slight incline corresponding to the incline of the flanged extension 14 of the bows so that when the parts are assembled and the side frames held by the end frames, the bows are held rigidly in place and act to stiffen the entire structure. The bows are arched as shown and the line of the bow is on a line with the upper flange 5 of the side frames.

The construction and arrangement of the front frame is clearly shown in Figs. 8, 9 and 10. This front frame 2 has a lower flange 15 and an upper flange 16, the joint between the body of the frame and the upper flange being curved as shown in Fig. 8. In the present instance the frame is bowed as clearly shown in Fig. 1 to give it a neat appearance. At each end of the front frame are rearwardly extending projections 17 which fit between the side frames 1 as clearly shown in Figs. 1 and 9 and the ends of the side frames abut shoulders 18 on the ends of the front frame. Each projection 17 has an upper flange 19 and a lower flange 20 which are continuations of the flanges 16 and 15 respectively. The front frame projections 17 are perforated at 21 for the passage of pivot bolts 22 which extend through the side frames as shown in Fig. 9. By this construction the end frame can be moved from the position shown by the dotted line in Fig. 16 to that shown in full lines, and when in the position, as in the full lines as illustrated in Fig. 8 and Fig. 16, it is held by bolts 23 which pass through openings in the flanges 20 of the projection 17 of the end frames and through the flange 7 of the side member 1 rigidly securing the parts together.

The construction and means for holding the rear frame 3 to the side frames 1 are clearly shown in Figs. 11 to 15 inclusive. The rear frame has an upper rounded flange 24 and a lower flange 25; each end of this rear frame is bent to form an end flange 26 with a curved projection 27. The flanges 26 fit the back of shaped plates 28, which are secured by welding to the side frames and the shaped projections 27 fit the shaped recesses in the plates 28, as shown clearly in Figs. 11 and 13.

In order to hold the end frame to the side frames, an angle brace 29 is located at each side of the top, as clearly shown in Figs. 1 and 11; each brace has a hook 30 at one end which engages a recess in the shaped plate 28, while the other end is attached by a cotter pin 31, or other fastening, to a bracket 32 secured to the end frame 3. Thus when the braces are secured in position they rigidly hold the rear end frame to the side frame.

Referring to Fig. 16, 33 is the cover for the top, which may be made of canvas, leather, or other suitable material, and this cover passes from the rear frame 3 around its lower flange 25 and is secured to said rear frame by rivets 34, while the front of the cover passes around the front frame 2 and over its lower flange 15 and is secured to said lower flange by rivets 35 or other fastenings. The sides of the cover preferably hang loose from the side frames, as clearly shown in Fig. 3, but may be secured to said side frames by buttons or other fastenings.

In order to stretch the cover tightly onto the top, the cover is secured to the front and rear frames before the parts leave the factory, although it can be secured by the user if desired. When the end frames are assembled with the side frames, the front end frame is in the position illustrated in dotted lines in Fig. 16, so that when all the parts are assembled, the front frame is turned down to the position illustrated in the full lines in Fig. 16 and secured by the bolts 23 stretching the material of the cover sufficiently to make it neatly fit the structure.

By the above construction the side frames and cross bows can be readily packed and shipped in comparatively small compass and the cover is rolled onto one or the other of the end frames and when it is desired to assemble the parts, all that is necessary is to place the bows in position in the sockets of the side frames, attach the front and rear frames to the side frames and stretch the cover over the assembled structure. The top can be put on the posts or panels of a wagon or truck, but if used on a pleasure car, it can be attached to the side structures in any suitable manner.

I claim:

1. In a vehicle top, the combination with side frames and cross bows, of sockets on said side frames having inclined tapered recesses, and end plates on said bows, having spaced tapering extensions removably wedged within said recesses.

2. In a vehicle top, the combination with side frames and end frames, of metal sockets on said side frames, each socket having a tapered recess formed by the metal of the socket and by a flanged filling piece within the socket and secured to the sides thereof; and bows extending from one side frame to the other, and having inclined projections removably fitting said recesses.

3. In a vehicle top, the combination with side frames, and an end frame having upper and lower reenforcing flanges, of a rearwardly extending projection at each end of said end frame, fitting between said side frames, shoulders on each end of said end frame abutting the ends of said side frames, pivot bolts securing said end frame pivotally to said side frames, and other bolts rigidly securing said end frame to said side frames.

4. In a vehicle top, the combination with side frames and an end frame, of a plate on the inner surface of each side frame near one end thereof, each plate having a portion spaced from said frame, projections on said end frame at each end thereof, arranged to fit between said plates and said side frames, and braces pivotally attached to said end frame, and each brace having a hook engaging one of said plates, whereby said end plate is detachably secured to said side frames.

5. A vehicle top frame, comprising, in combination, metallic side members, plates on said side members at their rear ends shaped to provide forwardly extending recesses between said plates and side members, sockets secured to said side members, said sockets having inclined tapered recesses, cross bows, end members secured to said cross bows, said end members having spaced, tapered and inclined projections arranged to fit removably within said socket recesses, a metallic rear cross member having forwardly extending end projections, shaped to seat in said recesses at the rear ends of said side members, braces pivoted to said rear cross member and having hooks engageable with said plates removably securing said rear cross member to said side members, a front frame member having rearwardly extending end portions aligning with the forward end portions of said side members and pivotally secured thereto, bolts engaging and locking together said ends of said side and front frame members, and a cover extended over said members, said side, front and rear members having lower reenforcing flanges, and also having upper rounded reenforcing flanges arranged to have said cover stretched thereover.

6. In vehicle top construction the combination with opposite side frames, of a front end frame of channel shape in cross-section having rearwardly extending channel shaped end portions abutting and pivotally secured to the front ends of said side frames, and a cover secured along its front to said front end frame and secured along its sides to said side frames, and detachable means engaging said end frame and side frames for preventing said end frame from pivoting on the side frames.

LEO I. HEINTZ.